United States Patent [19]
Hofmann et al.

[11] Patent Number: 6,093,793
[45] Date of Patent: Jul. 25, 2000

[54] PROCESS FOR THE PRODUCTION OF POLYETHER POLYOLS

[75] Inventors: Jörg Hofmann, Krefeld; Pramod Gupta, Bedburg; Harald Pielartzik, Krefeld, all of Germany

[73] Assignee: Bayer Aktiengesellschaft, Leverkusen, Germany

[21] Appl. No.: 09/008,986

[22] Filed: Jan. 20, 1998

[30] Foreign Application Priority Data

Jan. 27, 1997 [DD] German Dem. Rep. .......... 197027873

[51] Int. Cl.$^7$ ........................... C08G 65/30; C08G 65/34
[52] U.S. Cl. ........................ 528/411; 528/410; 210/729
[58] Field of Search ................... 528/416, 419, 528/425, 410, 411, 417; 210/729

[56] References Cited

U.S. PATENT DOCUMENTS

| | | | |
|---|---|---|---|
| 4,029,879 | 6/1977 | Muzzio | 536/4 |
| 4,129,718 | 12/1978 | Muzzio | 536/4 |
| 4,482,750 | 11/1984 | Hetzel | 568/621 |
| 4,543,430 | 9/1985 | Falgoux et al. | 568/678 |
| 4,687,755 | 8/1987 | Green | 502/159 |
| 4,762,952 | 8/1988 | Green | 568/678 |
| 4,792,627 | 12/1988 | Aoshima et al. | 564/487 |
| 5,342,903 | 8/1994 | Wolleb et al. | 525/407 |
| 5,344,964 | 9/1994 | Chu et al. | 528/409 |
| 5,478,920 | 12/1995 | Drysdale | 528/410 |

FOREIGN PATENT DOCUMENTS

| | | |
|---|---|---|
| 214684 | 4/1957 | Australia . |
| 0212820 | 4/1987 | European Pat. Off. . |
| 0855417A1 | 1/1998 | European Pat. Off. . |
| 73026391 | of 1973 | Japan . |
| 95/02625 | 1/1995 | WIPO . |
| 96/13540 | 5/1996 | WIPO . |

OTHER PUBLICATIONS

Encyclopedia of Polymer Science & Eng., vol. 6, New York (month unavailable) 1986 pp. 273–307.

*Primary Examiner*—Peter F. Kulkosky
*Attorney, Agent, or Firm*—Joseph C. Gil; Lyndanne M. Whalen

[57] ABSTRACT

Polyether polyols are produced by acid-catalyzed polyaddition of alkylene oxides to starter compounds having active hydrogen atoms. Perfluoroalkylsulfonic acid salts of metals from Group IIIA of the Periodic Table of Elements (corresponding to the IUPAC Convention of 1970) are used as the catalyst. The polyaddition reaction is carried out at a temperature of from 40 to 200° C. at normal pressure or pressures from 0 to 20 mbar (absolute). An inert organic solvent may optionally be included in the reaction mixture. Substantially all of the catalyst is removed from the polyether polyol-containing reaction mixture by lowering the temperature and/or by addition of a precipitating agent and/or by extraction with water. If desired, the recovered catalyst may be used in subsequent polyaddition reactions.

8 Claims, No Drawings

PROCESS FOR THE PRODUCTION OF POLYETHER POLYOLS

BACKGROUND OF THE INVENTION

The present invention relates to a process for the production of polyether polyols which is catalyzed with a Lewis-acid metal perfluoro-alkylsulfonate.

Polyether polyols are obtainable by polyaddition of alkylene oxides (such as ethylene oxide, propylene oxide, or butylene oxide) to compounds having active hydrogen atoms (also known as "starter compounds") such as alcohols, amines, acid amides or phenols. Polyether polyols are used to produce polyurethane plastics, surfactants and lubricants. The polyaddition of epoxides to starter compounds is generally conducted in known manner by alkali catalysis. The alkali catalysts typically used are alkali hydroxides. Among the disadvantages of alkali hydroxide catalyzed polyether polyol production methods are the long reaction-times (>5 hours) and the elaborate product processing necessitated by neutralization of the alkaline polymer. (See, for example, U.S. Pat. Nos. 4,129,718; 4,482,750 and 4,029,879; JP 73 26 391; and *Encyclopedia of Polymer Science & Eng,* Vol. 6, New York 1986, pages 273–307.) One of the problems encountered in these known processes is the base-catalyzed rearrangement of epoxides (e.g., propylene oxide) which takes place as a side-reaction and yields allyl or propenyl alcohols and monofunctional polyethers having a terminal double bond.

Acid catalysis (particularly with Lewis acids such as boron trifluoride) has also been used for the polyaddition of alkylene oxides to starter compounds. Production of polyether polyols by acid catalysis has the disadvantages of promoting side-reactions (e.g., the formation of volatile, low-molecular weight cyclic ethers) to an increased extent, substitution of hydroxyl groups with acid anions, and broader molecular weight distribution of the polyols than polyols produced by base catalysis. The fact that it is difficult to separate Lewis-acid catalysts from the reaction mixture and the susceptibility of acid catalysts to hydrolysis (necessitating use of special materials (e.g., enamels)) are also disadvantageous. Control of the reaction is also difficult due to the high activity of the catalyst.

U.S. Pat. No. 4,543,430 discloses a process for the production of addition products from an alkylene oxide or epichlorohydrin and hydroxyl group-containing compounds in the presence of trifluoromethanesulfonic acid salts (triflates) of the alkali metals, the metals in the 2nd group of the Periodic Table of Elements and also of the elements aluminum, cobalt, nickel, zirconium and tin. The use of aluminum triflate and zinc triflate is taught to be preferred. However, to achieve a high selectivity, it is necessary to use a large excess of hydroxyl group-containing compound. (See column 2, lines 51–53 of U.S. Pat. No. 4,543,430).

The process described in U.S. Pat. No. 4,543,430 is unsuitable for the production of polyether polyols by polyaddition of alkylene oxides to compounds having active hydrogen atoms (starter compounds) because this disclosed process produces a very high proportion of undesirable by-products (e.g., low-molecular cyclic ethers such as 1,3-dioxolane and 1,4-dioxane) and the polyether polyols obtained are dark brown in color due to the high by-product content. (See Comparative Example 7.)

EP-A 212,820 discloses a process for the production of glycol ethers in which an alkylene oxide is reacted with an alcohol in the presence of an aluminum perfluorosulfonic acid polymer catalyst. A high selectivity of the 1:1 adduct is attained by using a large excess of the alcohol. (See Example 3 in EP-A 212,820.)

With a view to increasing the selectivity, EP 569,331 discloses a process for the production of addition products in which an alcohol is reacted with an epoxide compound in the presence of a complex metal compound of a metal from the main groups or subgroups of the Periodic Table of Elements containing sulfonate residues of a perfluoro alkanesulfonic acid and also at least one weakly bonded, neutral monovalent or polyvalent ligand. Particularly suitable for this process is a metal-complex compound of the formula $La(CH_3CN)_x(H_2O)_y(CF_3SO_3)_3$. (See claim 12 in EP-A 569, 331.) A disadvantage of these metal-complex catalysts is the need for laborious separation and total recovery of the complex system composed of metal perfluoroalkyl sulfonate and ligand from the polyol reaction mixture. The low catalytic activity of these metal-complex compounds makes it necessary to use large quantities of catalyst in the polyether production process. (See Comparative Example 9.) The production of polyethers with these metal-complex compounds would therefore be very uneconomical.

WO 95/02625, WO 95/02626 and WO 96/13540 describe the polymerization of cyclic ethers (oxiranes, oxetanes, tetrahydrofurans, oxepanes, 1,3-dioxolanes or 1,3,5-trioxanes) to form linear polyethers by catalysis with metal perfluoroalkylsulfonates in the presence of an accelerator (co-catalyst) such as a carboxylic acid anhydride, a carboxylic acid, an acid chloride, a vinyl ether, and certain phosphorus or silicon compounds. Particularly preferred metals are scandium, yttrium and the rare-earth metals ytterbium, dysprosium, erbium, neodymium and lanthanum. (See WO 96/13540, page 6, line 35 and page 7, lines 1–2.) It is recommended that protic compounds (e.g., water and alcohols) be carefully excluded by suitable measures (e.g., drying of the initial materials). (See page 8, lines 23–27 in WO 96/13540.) The process described in these disclosures is therefore not suitable for the production of polyether polyols by polyaddition of epoxides to starter compounds having active hydrogen atoms.

SUMMARY OF THE INVENTION

It is an object of the present invention to provide a process for the production of polyether polyols in which the catalyst may be substantially completely removed from the polyol product by a relatively simple procedure.

It is another object of the present invention to provide a process for the production of polyether polyol in which the catalyst may be recovered and reused.

These and other objects which will be apparent to those skilled in the art are accomplished by reacting at least one compound having active hydrogen atoms with an alkylene oxide in the presence of a catalyst at a temperature of from about 40 to about 200° C. The catalyst is a perfluorosulfonic acid salt of a metal selected from Group IIIA of the Periodic Table of Elements. This catalyst may be readily separated from the product polyol mixture by reducing the temperature of the reaction mixture, addition of a precipitating agent or extraction with water.

DETAILED DESCRIPTION OF THE INVENTION

Surprisingly, it has now been found that the perfluoroalkylsulfonic acid salts (perfluoroalkylsulfonates) of the metals of Group IIIA of the Periodic Table of Elements (corresponding to the IUPAC Convention of 1970) are useful for the polyaddition of epoxides to starter compounds having active hydrogen atoms with high selectivity and catalytic activity and without the simultaneous presence of ligands or accelerators. It has also been found that the presence of the accelerators disclosed in WO 95/02625, 95/02626 and 96/13540 is disadvantageous in a process for the production of polyether polyols because the addition of such accelerators at comparable reaction rates causes a distinct increase in undesirable side-reactions (formation of low-molecular weight cyclic ethers). (See Comparative Examples 2 and 3.)

The process of the present invention produces polyether polyols by acid-catalyzed polyaddition of alkylene oxides to compounds having active hydrogen atoms. This process is characterized by the presence of perfluoroalkylsulfonic acid salts (perfluoroalkylsulfonates) of the metals pertaining to Group IIIA of the Periodic Table of Elements (corresponding to the IUPAC Convention of 1970) during the polyaddition reaction. The polyaddition process of the present invention is carried out at temperatures of 40 to 200C at normal pressure or pressures of from 0 to 20 bar (absolute), optionally in the presence of an inert organic solvent.

Preferred alkylene oxides for the process of the present invention include ethylene oxide, propylene oxide, butylene oxide, and mixtures thereof. Construction of polyether chains by alkoxylation is achieved by using a monomeric epoxide. Polyether chains may be constructed randomly or also blockwise by using two or three different monomeric epoxides. More detailed information about polyether chain construction can be obtained from *Ullmanns Encyclopedia of Industrial Chemistry*, English Edition, 1992, Volume A21, pages 670–671.

Suitable starter compounds (i.e., compounds having active H atoms) have molecular weights of from 18 to 400 and from 1 to 8 hydroxyl, thiol and/or amino groups. Examples of suitable starter compounds include: ethylene glycol, diethylene glycol, 1,2-propylene glycol, 1,4-butanediol, hexamethylene glycol, bisphenol A, trimethylolpropane, glycerin, pentaerythritol, sorbitol, raw sugar, degraded starch, water, methyl amine, ethyl amine, propyl amine, butyl amine, aniline, benzyl amine, o- and p-toluidine, α,β-naphthyl amine, ammonia, ethylene diamine, propylene diamine, 1,4-butylene diamine, 1,2-, 1,3-, 1,4-, 1,5- and/or 1,6-hexamethylene diamine, o-, m- and p-phenylene diamine, 2,4-, 2,6-tolylene diamine, 2,2'-, 2,4' and 4,4'-diaminodiphenyl-methane and diethylene diamine.

The catalysts useful in the process of the present invention are perfluoro alkylsulfonates of the metals of Group IIIA of the Periodic Table of Elements (corresponding to the IUPAC Convention of 1970). Suitable metals include scandium, yttrium and the rare-earth metals lanthanum, cerium, praseodymium, neodymium, promethium, samarium, europium, gadolinium, terbium, dysprosium, holmium, erbium, thulium, ytterbium and lutetium. "Mixed metal" (also called "didymium"), a mixture of rare-earth metals extracted from ore may also be used.

The term perfluoroalkylsulfonates as used herein means the metal salts of perfluoroalkylsulfonic acids in which the metal is bonded to at least one perfluoroalkylsulfonate group. In addition, other suitable anions may also be present. The perfluoroalkylsulfonate groups may in turn be bonded to a polymer matrix. The metal salts of trifluoromethane-sulfonic acid which are designated as trifluoromethane-sulfonates or triflates are preferred. Specific examples of these preferred catalysts include: scandium triflate, yttrium triflate, lanthanum triflate, cerium triflate, praseodymium triflate, neodymium triflate, samarium triflate, europium triflate, gadolinium triflate, terbium triflate, dysprosium triflate, holmium triflate, erbium triflate, thulium triflate, ytterbium triflate and lutetium triflate.

The polyaddition reaction catalyzed by the metal perfluoroalkyl-sulfonates is carried out at temperatures ranging from 40 to 200° C., preferably from 40 to 160° C., most preferably from 50 to 150° C., at normal pressure or pressures from 0 to 20 bar (absolute). The polyaddition process may be carried out in substance or in an inert organic solvent such as cyclohexane, toluene, xylene, diethyl ether, dimethoxyethane and/or chlorinated hydrocarbon (such as methylene chloride, chloroform or 1,2-dichloro-propane). The solvent, if used, is generally used in an amount from about 10 to about 30%.

The catalyst concentration is chosen so that effective control of the polyaddition reaction is possible under the given reaction conditions. The catalyst concentration is generally in the range of from 0.0005 wt-% to 10 wt-%, preferably from 0.001 wt-% to 5 wt-%, based on the quantity of alkylene-oxide adduct to be produced.

The reaction times for the polyaddition reaction range from a few minutes to several days, preferably a few hours.

The molecular weights of the polyethers produced by the process of the present invention range from 100 to 20,000 g/mol, preferably from 200 to 15,000 g/mol.

The stability of the metal perfluoroalkylsulfonates employed as catalyst, in particular of the triflates, in relation to compounds having active hydrogen atoms (e.g., water, alcohols), makes it unnecessary to use special materials (e.g., enamels) in the reaction apparatus.

The polyaddition process can be implemented continuously, in a batch process or in a semi-batch process.

In the course of known processes for the production of polyether polyols by polyaddition of epoxides to starter compounds by acid or Lewis-acid catalysis, the hydroxyl groups of the polyols are frequently substituted by acid anions. The total separation of these catalysts from the polyol is therefore very difficult. The susceptibility of "classical" Lewis-acid catalysts to hydrolysis also makes their re-usability for further polyaddition cycles impossible.

This disadvantage is eliminated by the process of the present invention. The catalyst used in accordance with the present invention may be substantially completely recovered from the reaction mixture after the polyaddition reaction has taken place by lowering the temperature of the reaction mixture or by addition of a precipitating agent selected from aliphatic, cycloaliphatic or aromatic hydrocarbons to the reaction mixture and/or by extraction of the reaction mixture with water.

The recovered catalyst may subsequently be purified in conventional manner and re-used (e.g., for further polyaddition reactions). The catalytic activity for polyaddition is fully preserved (Example 12).

The separation of the catalyst from the polyaddition reaction mixture is preferably conducted in such a way that the catalyst which is homogeneously dissolved at the reaction temperature (40 to 200° C.) is caused to precipitate out of the reaction mixture by lowering the temperature of the reaction mixture. It is particularly preferred that precipitation of the catalyst be accomplished by cooling the reaction mixture from reaction temperature (50–150° C. being particularly preferred) to ambient temperature (room temperature). The catalyst that has been precipitated out may then be separated from the polyol. This catalyst separation may be accomplished, for example, by filtration. The separated catalyst may then be re-used in further polyaddition cycles, optionally, after extraction of residual polyol adhering to the filter cake with a solvent for the polyol (precipitating agent for the catalyst, preferably aliphatic, alicyclic or aromatic hydrocarbons) and drying under reduced pressure. Catalyst separation by lowering the temperature is preferred where relatively high catalyst concentrations (i.e., 0.1–10 wt-%, relative to the quantity of alkylene-oxide adduct to be produced) have been used and/or where the polyether polyol is of high molecular weight (1,000–15,000 g/mol). After catalyst separation, the residual metal content in the polyol amounts to a maximum of 500 ppm.

Addition of a precipitating agent for the metal perfluoroalkyl-sulfonate makes it possible to precipitate more catalyst and thereby separate more of the catalyst from the polyol by filtration. Suitable precipitating agents include: aliphatic, alicyclic and aromatic hydrocarbons, particularly aliphatic hydrocarbons such as pentane, hexane, heptane, and petroleum ether. The precipitating agent for the catalyst is employed, relative to the polyether reaction mixture, in a volumetric ratio of precipitating agent:polyether reaction mixture of from 100:1 to 1:100, preferably from 10:1 to 1:10.

Precipitation of the catalyst is accomplished by homogeneous intermixing of precipitating agent and polyether reaction mixture. The catalyst that is precipitated out is separated by filtration, for example, and can (optionally after drying under reduced pressure) be used for further polyaddition cycles. The residual metal content in the polyol after separation of the catalyst is <200 ppm.

By extraction with water, the metal perfluoroalkylsulfonate catalyst can be quantitatively isolated from the polyol product. The extracting agent for the catalyst (water) is employed, relative to the polyether reaction mixture, in a volumetric ratio of extracting agent:polyether of from 100:1 to 1:1000, preferably from 10:1 to 1:100. The extracted catalyst can be used for further polyaddition cycles after removal of the extracting agent by distillation and, optionally, drying of the residue at reduced pressure and/or elevated temperature. The residual metal content in the polyol after this form of catalyst separation is <10 ppm, preferably <1 ppm.

Because the residual fluorine content of the polyols extracted by means of water lies below the detection limit of elemental analysis, no hydroxyl groups are substituted by perfluoro-alkylsulfonate anions in the polyether polyols produced in accordance with the claimed invention.

The process of the present invention can in general be carried out by the following procedure. Catalyst, starter compound (preferably propylene glycol) and, optionally, solvent are introduced into a reaction vessel and then brought to the desired reaction temperature (50–150° C. being particularly preferred) at pressures of 0–20 bar (abs.). Subsequently, the desired quantity of alkylene oxide (preferably propylene oxide) is dosed continuously into the reaction vessel by means of a controlled diaphragm pump. After completion of epoxide dosing and a post-reaction time at a predetermined temperature, volatile constituents may be removed by distillation at 90° C. for 30 minutes under reduced pressure (1 mbar) and analyzed by gas chromatography.

The products are isolated and the catalyst is separated by cooling to a lower temperature (generally room temperature). A fraction of the catalyst that was homogeneously dissolved at reaction temperature precipitates out and may be separated by filtration. Subsequently, a precipitating agent (e.g., hexane) may be added. The catalyst which precipitates out is filtered off and the precipitating agent is removed from the polyether by distillation.

The polyether polyols obtained by the process of the present invention are colorless to yellow-colored, viscous liquids which may be characterized by ascertaining the OH-numbers, the average molecular weight and molecular weight distributions $M_w/M_n$ (by MALDI-TOF-MS). (See U. Bahr, A. Deppe, M, Karas, F. Hillenkamp, U. Giessmann, Analytical Chemistry. 64, (1992), S. 2866–2869 and B. Trathnigg, B. Maier, G. Schulz, R. -P. Krüger, U. Just, Macromol. Symp. 110, (1996), S. 231–240).

Having thus described our invention, the following Examples are given as being illustrative thereof. All parts and percentages given in these Examples are parts by weight or percentages by weight, unless otherwise indicated.

EXAMPLES

Example 1

Polymerization of propylene oxide with yttrium(III)-triflate catalyst and propylene glycol starter Into a heatable reaction vessel with stirrer and reflux condenser, 1.58 g (20.8 mmol) of propylene glycol, 0.037 g (0.069 mmol) of yttrium(III) triflate and 1.8 g of toluene were introduced and subsequently heated up to 90° C. When the contents of the vessel had reached 90° C., 24.1 g (415 mmol) of propylene oxide were continuously dosed under normal pressure into the reaction vessel within 16 hours by means of a temperature-controlled diaphragm pump. After completion of the dosing of propylene oxide and a 5-h post-reaction time at 90° C., volatile constituents were removed by distillation at 90° C. for 30 min at 1 mbar. After cooling to room temperature and addition of 50 ml hexane, the precipitated catalyst was filtered off and the hexane was subsequently removed from the polyether by distillation. The product was characterized as follows:

| volatile constituents: | | 6.0% |
|---|---|---|
| polyether polyol: | color | light yellow |
| | OH No. (mg KOH/g) | 104 |
| | $M_n$ | 1086 |
| | $M_w/M_n$ | 1.13 |

Comparative Example 2

Polymerization of propylene oxide with yttrium(III)-triflate catalyst and propylene glycol starter in the presence of acetic acid (accelerator)

The procedure of Example 1 was repeated using the same materials in the same amounts with the exception that 0.069 mmol of acetic acid were included in the reaction mixture and 36.2 g (623 mmol) of propylene oxide were dosed into the reaction vessel over a period of 18 hrs. The product was characterized as follows:

| volatile constituents: | | 15.9% |
|---|---|---|
| polyether polyol: | color | light yellow |
| | OH No. (mg KOH/g) | 142 |
| | $M_n$ | 1037 |
| | $M_w/M_n$ | 1.14 |

Comparative Example 3

Polymerization of propylene oxide with yttrium(III)-triflate catalyst and propylene glycol starter in the presence of acetic anhydride (accelerator)

The procedure of Example 1 was repeated using the same materials in the same amounts with the exception that 3.29 g (43.3 mmol) of propylene-glycol and 0.069 mmol of acetic anhydride were used and that 33.6 g (578 mmol) of propylene oxide were dosed into the reaction vessel within 14 hours. The product was characterized as follows:

| volatile constituents: | | 9.1% |
|---|---|---|
| polyether polyol: | color | light yellow |
| | OH No. (mg KOH/g) | 150 |
| | $M_n$ | 783 |
| | $M_w/M_n$ | 1.11 |

Comparative Examples 2 and 3 show that use of yttrium (III)-triflate catalyst for the production of polypropylene glycol in the presence of accelerators (co-catalysts) as described in WO 95/02625 for the polymerization of cyclic ethers results in a distinct increase in undesirable volatile by-products.

Example 4
Polymerization of propylene oxide with ytterbium(III)-triflate catalyst and propylene glycol starter The procedure of Example 1 was repeated using the same materials in the same amounts with the exception that 0.043 g (0.069 mmol) of ytterbium(III)-triflate rather than ytterbium(III) triflate rather than yttrium(III) triflate were used and 21.6 g (371 mmol) of propylene oxide were dosed into the reaction vessel over a period of 14 hours. The product was characterized as follows:

| volatile constituents: | | 5.0% |
|---|---|---|
| polyether polyol: | color | light yellow |
| | OH No. (mg KOH/g) | 108 |
| | $M_n$ | 1207 |
| | $M_w/M_n$ | 1.14 |

Example 5
Polymerization of propylene oxide with gadolinium(III)-triflate catalyst and propylene glycol starter The procedure of Example 1 was repeated with the same materials in the same amounts with the exception that 0.042 g (0.069 mmol) of gadolinium(III)-triflate rather than yttrium(III)-triflate were used and that 21.7 g (373 mmol) of propylene oxide were dosed into the reaction vessel over a period of 20 hours. The product was characterized as follows:

| volatile constituents; | | 9.4% |
|---|---|---|
| polyether polyol: | color | light yellow |
| | OH No. (mg KOH/g) | 98 |
| | $M_n$ | 1290 |
| | $M_w/M_n$ | 1.18 |

Example 6
Polymerization of propylene oxide with lutetium(III)-triflate catalyst and propylene glycol starter The procedure of Example 1 was repeated with the same materials in the same amounts with the exception that 0.043 g (0.069 mmol) of lutetium(III) triflate rather than yttrium (III) triflate were used and that 25.2 g (433 mmol) of propylene oxide were dosed into the reaction vessel over a period of 14.5 hours. The product was characterized as follows:

| volatile constituents: | | 10.8% |
|---|---|---|
| polyether polyol: | color | light yellow |
| | OH No. (mg KOH/g) | 101 |
| | $M_n$ | 950 |
| | $M_w/M_n$ | 1.07 |

Comparative Example 7
Polymerization of propylene oxide with aluminum(III)-triflate catalyst and propylene glycol starter The procedure of Example 1 was repeated using the same materials in the same amounts with the exception that 0.033 g (0.069 mmol) of aluminum(III) triflate rather than yttrium (III) triflate were used and that 30.9 g (532 mmol) of propylene oxide were dosed into the reaction vessel over a period of 15.5 hours. The product was characterized as follows:

| volatile constituents: | | 20.8% |
|---|---|---|
| polyether polyol: | color | dark brown |
| | OH No. (mg KOH/g) | 91 |
| | $M_n$ | 953 |
| | $M_w/M_n$ | 1.07 |

A comparison of the products of Examples 1, 4, 5, 6 and Comparative Example 7 makes clear that in the production of polypropylene glycol by catalysis with aluminum(III) triflate (taught to be preferred in U.S. Pat. No. 4,543,430 for the production of addition products from alkylene oxides and compounds having hydroxyl groups), a distinct increase in the formation of undesirable volatile by-products occurs and an undesirable dark-brown discoloration of the polyether polyol is obtained.

Example 8
Polymerization of propylene oxide with lanthanum(III)-triflate catalyst and propylene glycol starter The procedure of Example 1 was repeated using the same materials in the same amounts with the exception that 0.202 g of lanthanum(III) triflate rather than yttrium (III) triflate were used, 4.5 g of toluene were used as solvent, and 17.5 g (302 mmol) of propylene oxide were dosed into the reaction vessel over a period of 19 hours. The product was characterized as follows:

| volatile constituents: | | 7.9% |
|---|---|---|
| polyether polyol: | color | colorless |
| | OH No. (mg KOH/g) | 116 |
| | $M_n$ | 1021 |
| | $M_w/M_n$ | 1.11 |

Comparative Example 9
Polymerization of propylene oxide with propylene glycol starter and $La(CH_3CN)_x(H_2O)_y(CF_3SO_3)_3$ catalyst (synthesis according to EP A 569 33 1; lines 14–21, page 7, La content: 24.1%; C content: 9.27 %; N contents 1.96 %)

The procedure of Example 1 was repeated using the same materials in the same amount with the exception that 0.404 g of La(CH$_3$CN)$_x$(H$_2$O)$_y$(CF$_3$SO$_3$)$_3$ were used, 4.5 g of toluene were used as solvent and 15.2 (262 mmol) of propylene oxide were dosed into the reaction vessel over a period of 19 hrs. The product was characterized as follows:

| volatile constituents: | | 3.0% |
|---|---|---|
| polyether polyol: | color | light yellow |
| | OH No. (mg KOH/g) | 147 |
| | M$_n$ | 854 |
| | M$_w$/M$_n$ | 1.07 |

A comparison of the products of Example 8 and Comparative Example 9 makes it clear that the metal-complex compound La(CH$_3$CN)$_x$(H$_2$O)$_y$(CF$_3$SO$_3$)$_3$ (taught in EP A 569,331 to be preferred for selective production of addition products from alcohol and epoxide) possesses a substantially lower catalytic activity for the production of polypropylene glycol than the ligand-free lanthanum(III) triflate La(CF$_3$SO$_3$)$_3$ and accordingly has to be used in significantly higher concentrations.

Example 10
Polymerization of propylene oxide with yttrium(III)-triflate catalyst and propylene glycol starter—Catalyst separation 1.58 g (20.8 mmol) propylene glycol, 0.738 g (1.38 mmol) yttrium(III) triflate and 1.8 g toluene were introduced into the reaction vessel and heated to 90° C. When the contents of the vessel had reached 90° C., 35.3 g (608 mmol) of propylene oxide were charged into the reaction vessel over a period of 4 h. After charging of the propylene oxide had been completed and a 5-h post-reaction time at 90° C., volatile constituents were removed by distillation at 90° C. for 30 min at 1 mbar.

The catalyst was then separated from the reaction mixture by cooling the reaction mixture to ambient temperature. A fraction of the catalyst precipitated out. After filtration, the residual yttrium content in the polyol was 380 ppm. This corresponds to a catalyst separation from the polyol of 89.6%.

50 ml of hexane were then added to the reaction mixture and additional catalyst was precipitated out. After filtration and removal of the hexane by distillation, the residual yttrium content in the polyol amounted to 80 ppm. This corresponds to a catalyst separation from the polyol of 98.1%.

The polyether polyol/hexane phase was then extracted with water prior to removal of the hexane by distillation. Residual yttrium content in the polyol was <1 ppm. Catalyst separation from the polyol was 100%.

Example 11

The procedure of Example 10 was repeated using the same materials in the same amounts with the exception that 0.074 g (0.138 mmol) of yttrium(III) triflate were used and 27.4 g (472 mmol) of propylene oxide were dosed into the reaction vessel over a period of 11 hours.

After cooling to ambient temperature and addition of 50 ml hexane, the catalyst that was precipitated out was filtered off and the hexane was removed from the polyether by distillation. Residual yttrium content in the polyol was 145 ppm and catalyst separation from the polyol was 68%.

After aqueous extraction of the polyether polyol/hexane phase, the residual yttrium content in the polyol was <1 ppm, the residual fluorine content in the polyol was <50 ppm, and the catalyst separation from the polyol was 100%.

Example 12 (Re-use of catalyst)

The catalyst from Example 10 that was precipitated (98.1% of the catalyst employed) after addition of hexane was filtered off, dried under reduced pressure (1 mbar) and subsequently used for a second polymerization under the same reaction conditions as were used in Example 10. 36.2 g (623 mmol) of propylene oxide were charged into the reaction mixture over a period of 4.5 h. After a 5-h post-reaction time, volatile constituents were removed by distillation (90° C./30 min/1 mbar), the reaction mixture was cooled to room temperature, 50 ml of hexane were added, the catalyst which had precipitated out was filtered off and the hexane was removed by distillation. The product was characterized as follows.

| volatile constituents: | | 14.5% |
|---|---|---|
| polyether polyol: | color | yellow |
| | OH No. (mg KOH/g) | 93 |
| | M$_n$ | 1265 |
| | M$_w$/M$_n$ | 1.12 |

For comparison: Product from Example 10:

| volatile constituents: | | 15.0% |
|---|---|---|
| polyether polyol: | color | colorless |
| | OH No. (mg KOH/g) | 102 |
| | M$_n$ | 1227 |
| | M$_w$/M$_n$ | 1.06 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyether polyol comprising reacting
    a) at least one compound having active hydrogen atoms which is derived from a starter compound having from 1 to 8 hydroxyl, thiol or amino groups with
    b) at least one alkylene oxide in the presence of
    c) a catalyst which is a perfluorosulfonic acid salt of a metal selected from the group consisting of scandium, yttrium, lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americum, curium, berkelium, californium, einsteinium, fermium, mendelevium, nobelium, lawrencium and didymium in which the metal is bonded to at least one perfluoroalkylsulfonate group
    at a temperature of from about 40 to about 200° C. in the absence of an accelerator selected from the group consisting of carboxylic anhydrides, acyl halides, carboxylic acids having a pK$_a$ in water of less than about 6, silicon compounds in which one or more silicon atoms is bound to a group whose conjugate acid has a pK$_a$ of 16 or less in water, vinyl ester accelerators and phosphorous compounds which act as accelerators.

2. The process of claim 1 in which an inert organic solvent is present during the reaction.

3. The process of claim 1 in which the catalyst c) is recovered after the reaction by lowering the temperature of the reaction mixture to room temperature and separating the catalyst c) from the cooled mixture.

4. The process of claim 1 in which the catalyst c) is recovered after the reaction by adding a precipitating agent to the reaction mixture and separating the precipitated catalyst c) from the reaction mixture.

5. The process of claim 4 in which the precipitating agent is an aliphatic hydrocarbon, a cycloaliphatic hydrocarbon or an aromatic hydrocarbon.

6. The process of claim 1 in which the catalyst c) is recovered after the reaction by extraction with water.

7. The process of claim 1 in which the catalyst c) is recovered after the reaction by lowering the temperature of the reaction mixture to room temperature and/or adding a precipitating agent and/or extraction with water.

8. The process of claim 7 in which the catalyst c) is recovered in a reusable form.

* * * * *